Oct. 11, 1927.
H. A. HANDS
1,644,829
METHOD RELATING TO THE MANUFACTURE OF RUBBER WATER BOTTLES
Filed March 21, 1927
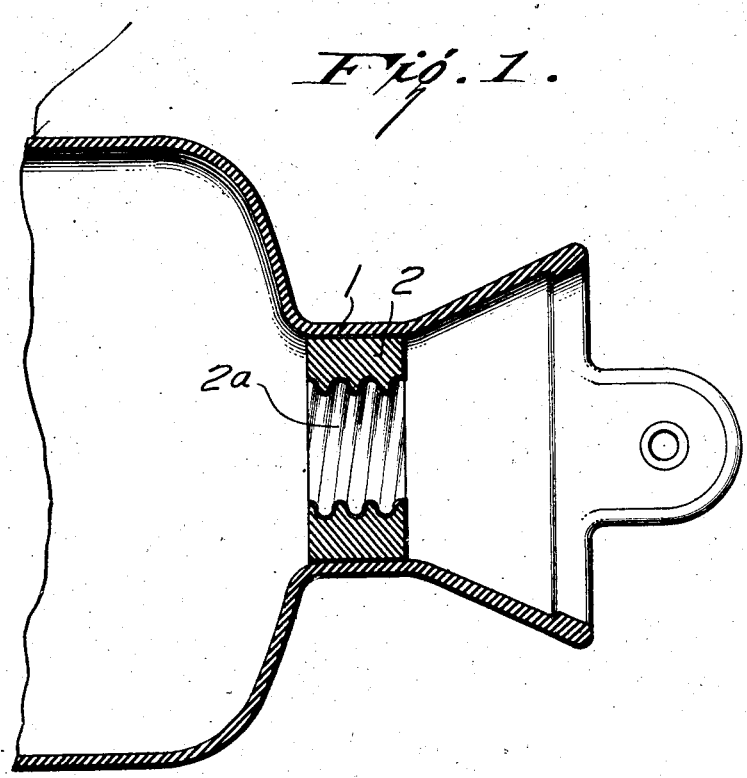
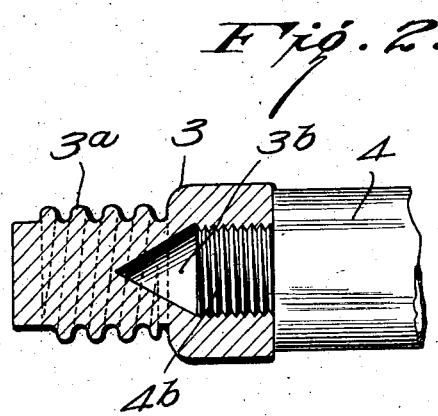
Inventor
HOWARD A. HANDS,
Attorneys Patented Oct. 11, 1927.

1,644,829

UNITED STATES PATENT OFFICE.

HOWARD A. HANDS, OF WATERTOWN, MASSACHUSETTS, ASSIGNOR TO HOOD RUBBER COMPANY, OF WATERTOWN, MASSACHUSETTS, A CORPORATION OF MASSACHUSETTS.

METHOD RELATING TO THE MANUFACTURE OF RUBBER WATER BOTTLES.

Application filed March 21, 1927. Serial No. 177,010.

My present invention relates to an improved method of securing in the necks of water bottles, made of soft or flexible rubber, the hard rubber ferrules which are provided to receive the screw closure plugs.

The invention aims to provide an improved method by which such bags may have the ferrules expeditiously and firmly secured therein without damage to the neck of the bag through application of too much heat thereto, and the invention comprises the novel method hereinafter described and defined by the appended claims.

In order that the invention may be better understood reference is made to the accompanying drawing in which:—

Fig. 1 is a sectional view through the neck of a bottle with the ferrule in place therein.

Fig. 2 is a sectional view of the heat transmitting element and a portion of a soldering iron engaged therewith.

Referring by reference characters to this drawing, the numeral 1 designates the neck of a water bottle of the usual type and 2 the hard rubber ferrule adapted to fit within the neck and having a threaded bore 2ᵃ to receive the usual closure plug or stopper (not shown). Before the ferrule is inserted in the neck, either the internal surface of the neck or the corresponding exterior surface of the ferrule, is provided with a coating of vulcanizable rubber cement of known character, whereafter the ferrule is inserted in the neck into the position shown in Fig. 1.

To effect the vulcanization of the cement, I provide an element 3 having a reduced portion provided with screw threads 3ᵃ adapted to screw into the threaded bore of the hard rubber ferrule and having in its larger end an internally screw threaded axial recess. The electric soldering irons in common use are provided with threaded ends upon which are screwed removable soldering tips as is well known.

The forward end of such soldering iron is shown conventionally at 4 in Fig. 2. To enable such a soldering iron to be used to carry out my process the element 3 is adapted to replace the usual soldering tip, its bore 3ᵇ being adapted to screw onto the threaded end 4ᵃ of the iron 4 after the tip has been removed.

The element 3 is made of good heat conducting material such as brass or bronze for example and, having been applied to the soldering iron and screwed into the hard rubber ferrule with the latter in place in the bottle neck, the electric current is turned on (regulated to produce the proper degree of heat), which heat is transmitted to and through the hard rubber ferrule until the cement is completely cured. While this is taking place the neck of the bottle has its exterior exposed to the air which constitutes a cooling fluid.

I have found that by this method the necessary heat may be applied without detrimentally affecting the hard rubber ferrule and without danger of damaging the soft rubber neck, towards which the air exposure contributes.

Obviously the ferrule may be applied to the element 3 while the latter is in place on the soldering iron tip (before the heating current is turned on) and the soldering iron used as a convenient handle for inserting the ferrule in the neck.

What I claim is:

1. The herein described method of securing screw ferrules in the mouths of rubber water bottles which consists in providing a vulcanized soft rubber water bottle and a hard rubber ferrule having an internal threaded bore and a smooth external surface to fit the internal surface of the neck of the bottle, coating one of said surfaces with a vulcanizable cement, inserting the ferrule in the neck, and vulcanizing the cement by heat transmitted through the ferrule.

2. The herein described method of securing screw ferrules in the mouths of rubber water bottles which consists in providing a vulcanized soft rubber water bottle and a hard rubber ferrule having an internal threaded bore and a smooth external surface to fit the internal surface of the neck of the bottle, coating one of said surfaces with a vulcanizable cement, inserting the ferrule in the neck, and vulcanizing the cement by heat transmitted through the ferrule, while maintaining the exterior surface of the neck of the bottle exposed to the action of a cooling fluid.

In testimony whereof I affix my signature.

HOWARD A. HANDS.